(12) United States Patent
Chiu et al.

(10) Patent No.: US 7,404,663 B2
(45) Date of Patent: Jul. 29, 2008

(54) BACKLIGHT MODULE

(75) Inventors: Chi-Hao Chiu, Jhongli (TW); Ping-Fu Wang, Yangmei Township, Taoyuan County (TW)

(73) Assignee: Hannstar Display Corporation, Taoyuan (TW)

( * ) Notice: Subject to any disclaimer, the term of this patent is extended or adjusted under 35 U.S.C. 154(b) by 112 days.

(21) Appl. No.: 11/102,300

(22) Filed: Apr. 8, 2005

(65) Prior Publication Data

US 2006/0227544 A1 Oct. 12, 2006

(51) Int. Cl.
*F21V 7/04* (2006.01)
(52) U.S. Cl. .................. 362/634; 362/218; 362/613; 349/58; 349/65; 385/146; 385/901
(58) Field of Classification Search .......... 362/221, 362/613, 614, 218, 634; 349/58, 65; 385/129–131, 385/146, 901
See application file for complete search history.

(56) References Cited

U.S. PATENT DOCUMENTS

| 2,301,238 | A | * | 11/1942 | Alm | 362/221 |
| 6,147,724 | A | | 11/2000 | Yoshii et al. | 349/62 |
| 6,295,105 | B1 | | 9/2001 | Lee et al. | 349/65 |
| 6,341,879 | B1 | | 1/2002 | Skinner et al. | 362/295 |
| 6,388,722 | B1 | | 5/2002 | Yoshii et al. | 349/62 |
| 6,417,832 | B1 | | 7/2002 | Skinner et al. | 345/102 |
| 6,839,100 | B1 | | 1/2005 | Saito et al. | 349/58 |
| 7,044,629 | B2 | * | 5/2006 | Moon | 362/634 |
| 7,223,003 | B2 | * | 5/2007 | Kim | 362/561 |
| 2003/0137825 | A1 | * | 7/2003 | Yu et al. | 362/31 |
| 2006/0044830 | A1 | * | 3/2006 | Inoue et al. | 362/614 |
| 2006/0098454 | A1 | * | 5/2006 | Tseng et al. | 362/614 |
| 2006/0139959 | A1 | * | 6/2006 | Bae et al. | 362/615 |

FOREIGN PATENT DOCUMENTS

JP 2006156323 * 6/2006
KR 10200497633 * 10/2004

* cited by examiner

*Primary Examiner*—Sandra L. O'Shea
*Assistant Examiner*—Meghan K Dunwiddie
(74) *Attorney, Agent, or Firm*—J.C. Patents

(57) ABSTRACT

A backlight module is suitable for use in a liquid crystal display. The backlight module includes a back plate, and a lamp, over the back plate by a distance. The back plate has a hole under the lamp. The hole can be a hole under the lamp corresponding to an electrode of a high voltage end of the lamp. The hole or a certain number of the holes can be replaced by an indentation, which can also effectively increase the separation distance between the lamp and the back plate. Actually, the hole and the indentation can be used together to form a desired pattern corresponding to the lamp. The lamp can be a plurality of lamp.

8 Claims, 9 Drawing Sheets

BACKLIGHT MODULE

BACKGROUND OF THE PRESENT INVENTION

1. Field of Invention

The present invention relates to light module. More particularly, the present invention relates to a backlight module, suitable for use in liquid crystal display (LCD).

2. Description of Related Art

Recently, the technology of the LCD panel has been well developed. Now, the LCD panel has been quite popular in the daily life for information communication, such as TV, display screen, computer terminal . . . and so on. Since the liquid crystal does not generate the light by itself, the LCD needs a light module as a light source to display the color image; the LCD is usually implemented with a light module. The backlight module is one of the light modules, used in LCD to provide a planar light source at the back of the LCD panel. In other words, the LCD panel has the displaying part and a light module. The displaying part can be the assembly structure in state-of-the-art other than the light module. A top view of a conventional backlight module is schematically shown in FIG. 1. In FIG. 1, the conventional backlight module includes a plurality of lamps 100, which are located above a grounded back plate 102. The lamps 100 are arranged one by one in parallel to the grounded back plate 102, so as to produce a uniform planar light source. The lamps 100 usually are cold cathode fluorescent light, and the back player usually is an A1 plate being grounded. The backlight module also include other elements, such as reflector, holding frame . . . and so on, which should be known by the ordinary skilled artisans and are not further described here.

The lamp 100 are typically applied a bias between a high voltage and a low voltage, so as to produce current and trig the light. However, since the lamp 100 is located above the grounded back plate 102, a leakage current is not avoidable. FIG. 2 is a drawing, schematically illustrating the mechanism of leak current for the conventional backlight module. In FIG. 2, the lamp 100 is separated from the back plate 102 by a distance D, such as 1 mm-2 mm. In electric property, there are many equivalent parasitic capacitors existing between the lamp 100 and the back plate 102. The lamp 100 has high voltage end Hi at a current level of IL-1 and a low voltage end Lo at a current level of IL-2. The length of the lamp 100 is L, then the current at the beginning end at the level IL-1, and is gradually leaks to the grounded back plate 102 along the length. The dropping amount is due the leak current. The actual current at the low end is at the level of IL-2. If the leak current is small, the current should remain at the level IL-2'. The leak current reduces the luminance of the lamp 100.

FIG. 3 is a drawing, schematically illustrating the phenomenon of leak current in more detail. In FIG. 3, as one can see, when the light is turned on, the current in a short time period is triggered by the applied bias. Then, the current flows toward to the low voltage end in the time period. However, due to the leak current, the current gradually leaks to the grounded back plate in the time period.

According to the electric property, if the distance D is larger, then the capacitance is smaller. In other words, the distance D is infinity, then the lamp is isolated, and there is no leak current. FIG. 4 is a drawing, schematically illustrating two parameters, which are related to the quantity of leak current. One parameter is the distance D as shown at the left curve and the other parameter is applied bias V as shown at the right curve. Since the bias V consumes the power, the designer would like to keep the operation bias as low as possible. Then, the parameter D may be considered for improving the luminance of the lamp at the same operation bias. However, a large distance D certainly causes a large thickness of the light module, causing the increase thickness of the LCD. The distance D cannot be freely increased to solve the leak current. The technology is still under developing by the manufacturers, so as to increase the effective luminance without increasing the operation voltage.

In further consideration, U.S. Pat. No. 6,839,100 has disclosed an LCD device with a longitudinal lamp at side. In order to hold the lamp, two lamp holders enclose the both electrode ends of the lamp. Then, a lower frame usually in contact with the lamp holder, so that the heat at the both electrode ends is dispersed to the lower frame through the lamp holder, causing an undesired temperature drop at the both electrode end for the fluorescent lamp. In order to solve this thermal issue, the lower frame is designed with two openings near the both electrode ends. As a result, the lamp holder is not contact with the lower frame, and the opening of the lower frame may solve the thermal effect. However, the electric property, such as the leakage current as discussed above is not considered. U.S. Pat. No. 6,839,100 does not solve the electric issues discussed above and the structure of the present invention mentioned below.

SUMMARY OF THE PRESENT INVENTION

The present invention provides a backlight module, in which the luminance of the lamp can be effectively improved without changing the operational voltage.

The present invention provides a backlight module; in which the back plate is designed to have hole or an indentation along the desired location of the lamp, so as to equivalently reduce the parasitic capacitance while the separation distance of the back plate may remain without increasing.

The present invention provides a backlight module used for a liquid crystal display. The backlight module includes a back plate having a first hole, and a lamp disposed on the back plate, having a longitudinal direction, a high voltage end having an electrode and a low voltage end opposing to the high voltage end. Wherein, the first hole is corresponding to the electrode of the high voltage end of the lamp.

The present invention also provides a backlight module used for a liquid crystal display. The backlight module comprises a back plate having a first indentation, and a lamp disposed on the back plate, having a longitudinal direction, a high voltage end having an electrode and a low voltage end opposing to the high voltage end. Wherein, the first indentation is corresponding to the electrode of the high voltage end of the lamp.

In another aspect of the present invention, the hole and the indentation as described above can be used together to form a desired pattern corresponding to the lamp. When the lamp is an assembly from a plurality of lamps, the light module produce a planar light source with reduces leak current, resulting in increase of the luminance.

It is to be understood that both the foregoing general description and the following detailed description are exemplary, and are intended to provide further explanation of the present invention as claimed.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

FIG. 2 is a schematic view of illustrating the phenomena of leak current occurring in a conventional backlight module.

FIG. 3 is a schematic view of illustrating the phenomena of leak current occurring in another conventional backlight module.

FIG. 4 is a schematic view of illustrating the phenomena of leak current occurring in another conventional backlight module.

FIGS. 5A-9C are drawings, schematically illustrating various designs of the back plate under the same motivation, according to the preferred embodiments of the present invention.

FIGS. 5A-5B are schematic views of a backlight module according to a preferred embodiment of the present invention.

FIG. 7 is a schematic view of a backlight module according to another preferred embodiment of the present invention.

FIGS. 9A-9C are schematic views of a back niate according to three preferred embodiments of the present invention.

DESCRIPTION OF THE PREFERRED EMBODIMENTS

The present invention has provided a technology to reduce the conventional issues of leak current in a backlight module, so as to increase the luminance of the lamp. Under the same design principle, several embodiments are provided as the examples for descriptions. However, the present invention is not just limited to the descriptions.

Figure 5A:
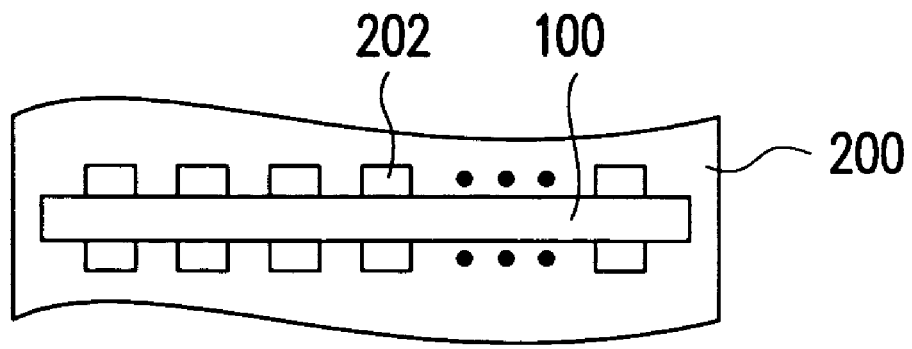
Figure 5B:
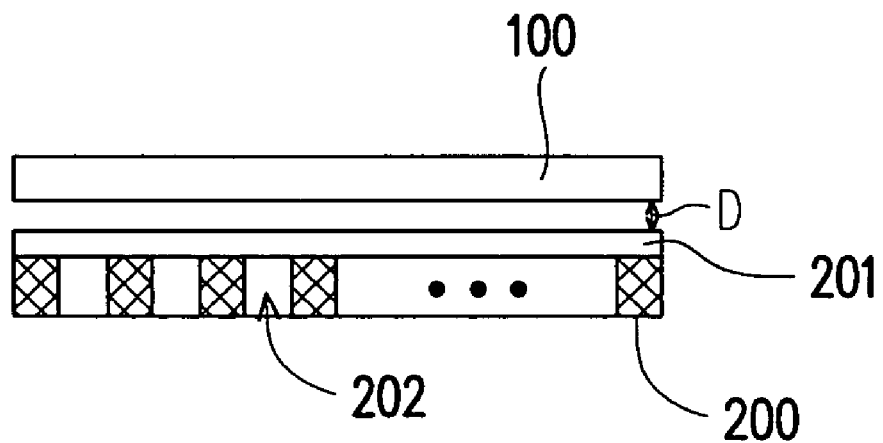

FIGS. 5A-9C are drawings, schematically illustrating various designs of the back plate under the same motivation, according to the preferred embodiments of the present invention. In FIG. 5A, only one lamp is schematically shown in top view, as the example. The back plate 200 has a hole 202, such as a plurality of holes in this example. The holes 202 are distributed along the longitudinal direction of the lamp 100. In FIG. 5B, the cross-sectional view schematically shows the back plate 200, preferably with a reflector 201 on the back plate 200. A distance D is, for example, between the lamp 100 and the back plate 200. The shape of the holes 202 can be rectangular, square, circle or other profiles. The separating distance between the adjacent holes can be regular or irregular. This is depending on the actual design option.

Since the holes 202 of the back plate 200 can be considered to be infinite separation from the lamp, the leak current can be effectively reduced.

Figure 6A:
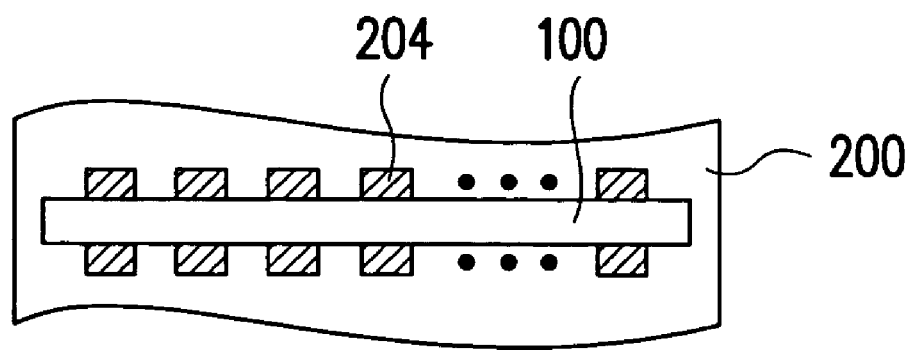
FIGS. 6A-6C are schematic views of a backlight module according to another preferred embodiment of the present invention.
Figure 6B:
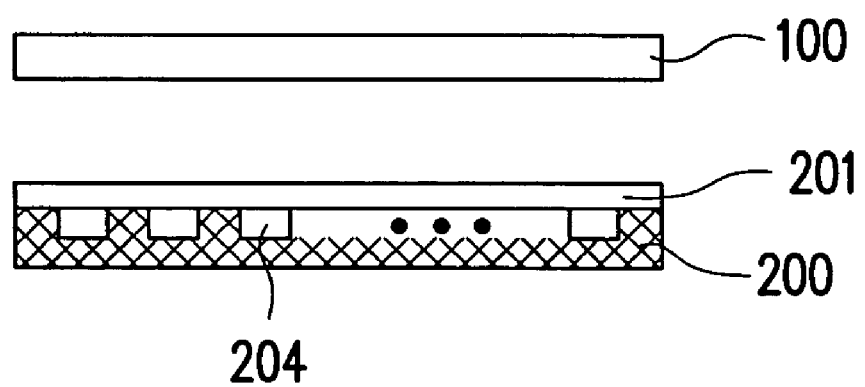
Figure 6C:
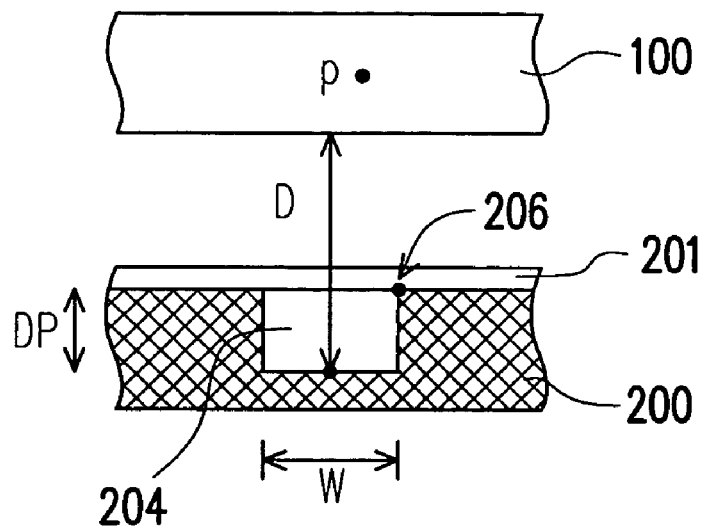
Figure 6D:
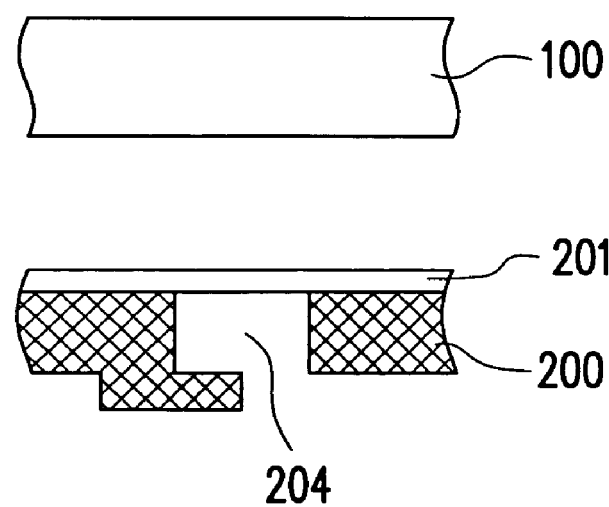
FIG. 6D is a schematic view of a backlight module according to a modified embodiment of the present invention.

Alternatively, in order to increase the distance D between the lamp 100 and the back plate 200, the holes 202 can be replaced by the indentation. In FIG. 6A, the hole 202 in FIG. 5A is replace by the indentation 204, and the cross section of the indentation 204 is shown in FIG. 6B. In this example, the back plate can be mechanically worked by, for example, pressing, so as to form the indentation 204. FIG. 6C shows the structure of the indentation in more detail. Since the indentation 204 is formed on the back plate 200, the corner 206 may be the mechanical weak point. However, it should be no problem by the current mechanical work technology without causing damage of the back plate. Taking the rectangular indentation as the example, the width W and the depth DP are the parameters to be considered. If the depth DP is greater, it indicates that the distance D from the point P of the lamp 100 to the bottom of the indentation 204 is increased to have the equivalently large distance D. The leak current can be reduced. However, if the depth DP is greater than a certain value, the leak current may approach to zero. The different width W also produces the different effect for reduce the leak current. However, the actual quantity of the distance D, the width W and the depth DP are the design parameters, and can be optimized under the operation voltage of the lamp. However, the indentation 204 can be, for example, designed with an additional hole, as shown in FIG. 6D.

Figure 7:
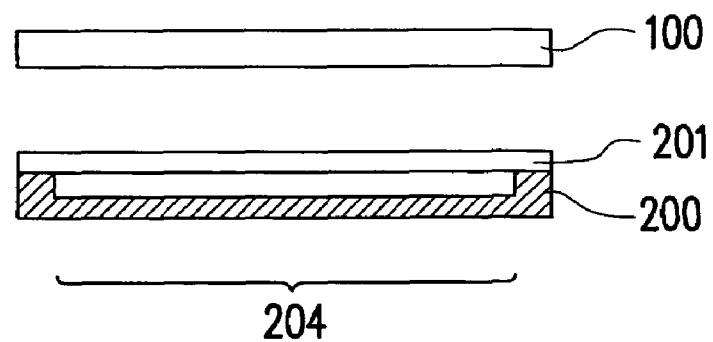

Alternatively, the hole 202 in FIG. 5A can be a stripe shape along the longitudinal extension of the lamp 100. Similarly, the indentation 204 can also be a stripe shape. FIG. 7 shows the cross section of the stripe shape indentation 204. Preferably, the indentation 204 can be just single and substantially extending along the longitudinal direction of the lamp 100.

Figure 8A:
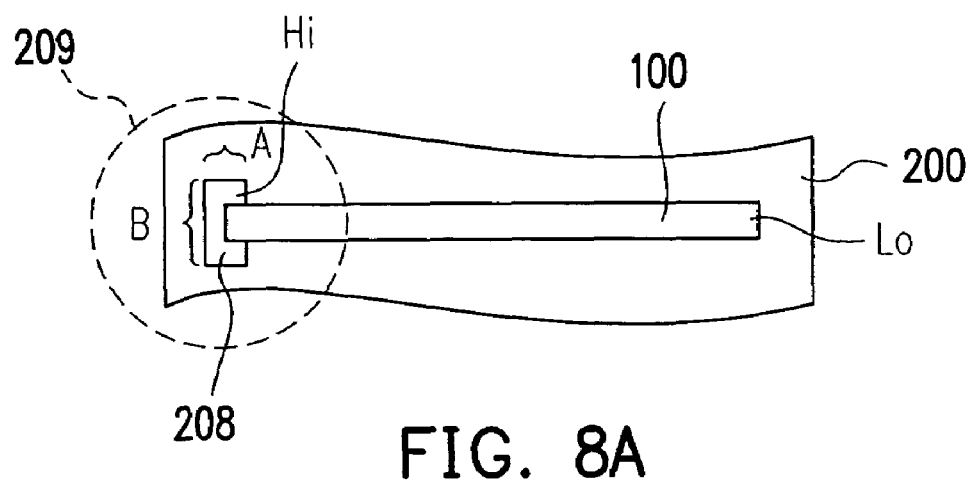
FIGS. 8A-8C are schematic views of a backlight module according to three preferred embodiments of the present invention.

In FIG. 8A, the lamp 100 typically has the high voltage end (Hi) and the low voltage end (Lo). Relatively, the high voltage end has more tendencies to have leak current. In this consideration, it has been significantly sufficient to reduce the leak current by applying a single hole 208 at the location around the high voltage end (Hi). Usually, the hole 208 can be, for example, a rectangular shape with a width A and a length B, but the rectangular shape is not the only option. Moreover, the region 209 of the high voltage end can be further designed as shown in FIG. 8B and FIG. 8C.

Figure 8B:
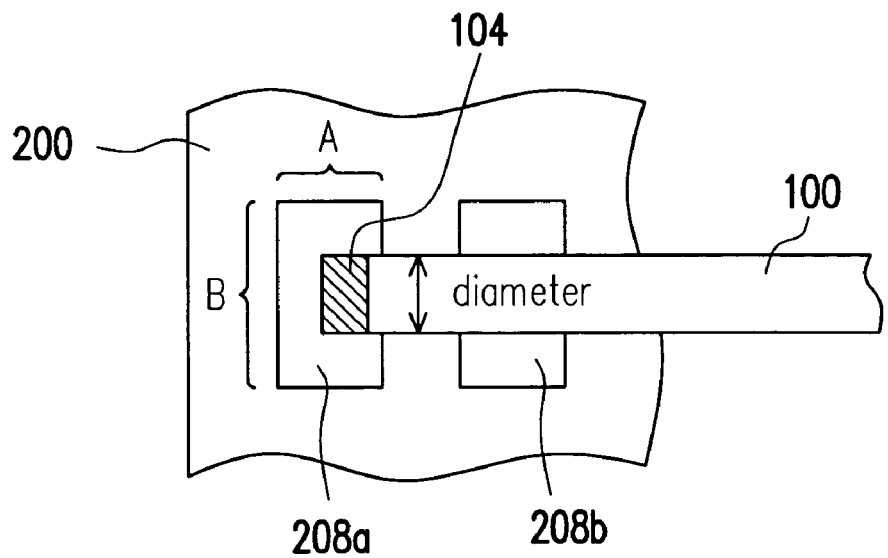

In FIG. 8B, the single hole 208 is considered as the first hole 208a. Then, it may include a second hole 208b approach to the electrode 104 of the high voltage end of the lamp 100. The parameters of A and B are determined according to the diameter and the length of the electrode 104 of the high voltage end of the lamp 100. Preferably, the length B of the first hole 208a is larger than twice of a diameter of the electrode 104 of the high voltage end of the lamp 100. Preferably, the width A of the first hole 208a is larger than a length of the electrode 104 of the high voltage end of the lamp 100.

Figure 8C:
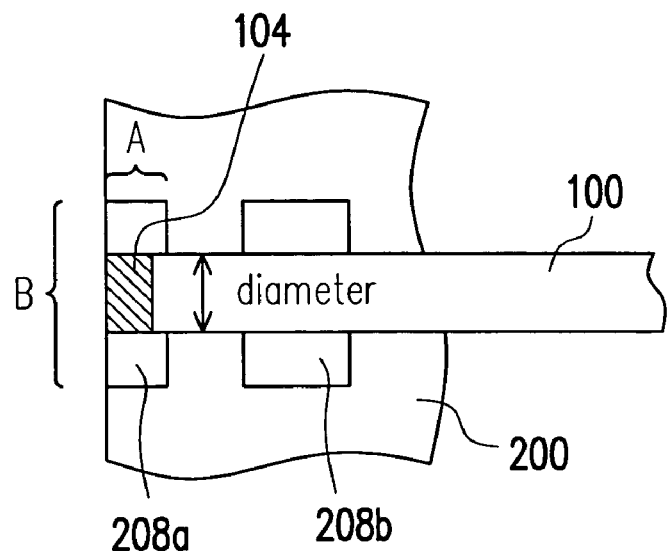

Alternatively, the edge of the lamp 100 may match with the edge of the back plate 200, as shown in FIG. 8C. In this situation, the first hole 208a may substantially match with the edge of lamp 100. This is also a design choice, according to the present invention. However, the width A of the first hole 208a preferably can cover over a length of the electrode 104 of the high voltage end of the lamp 100. Then, it may include a second hole 208b approaching to the electrode 104 of the high voltage end of the lamp 100.

Figure 9A:
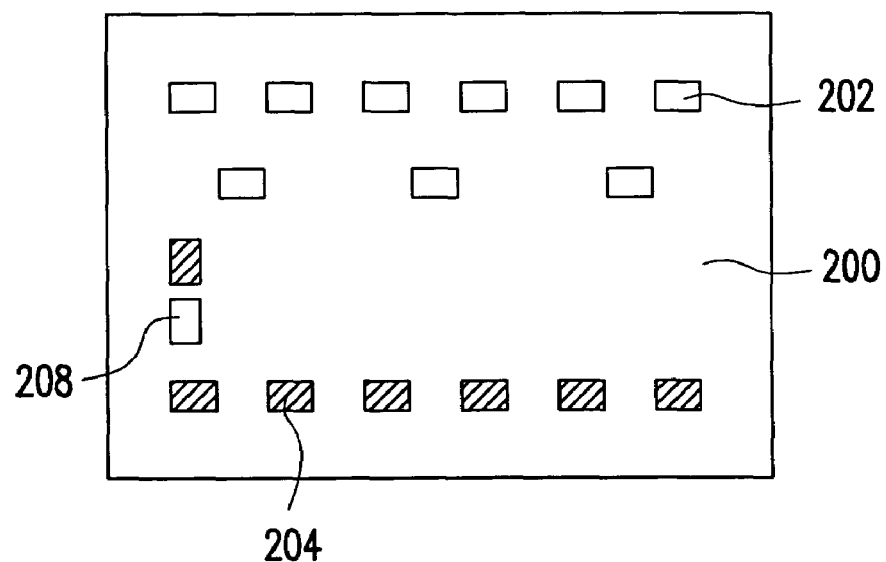
Figure 9B:
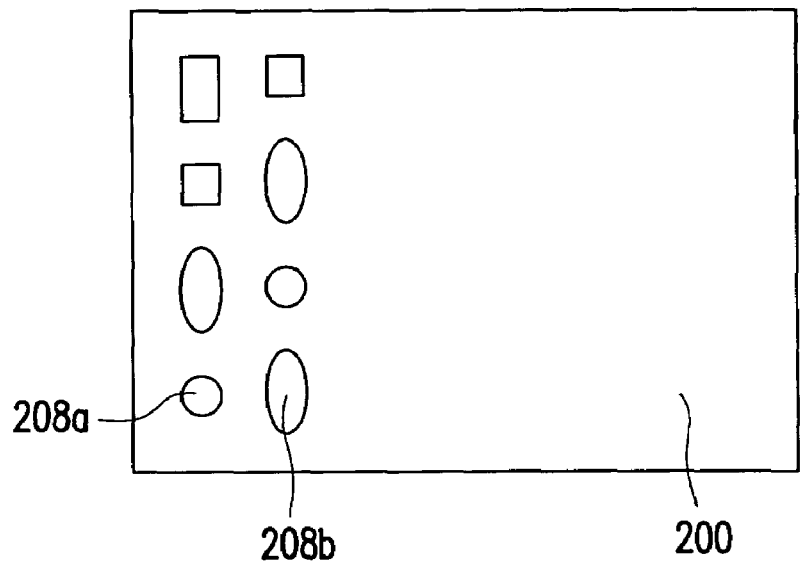
Figure 9C:
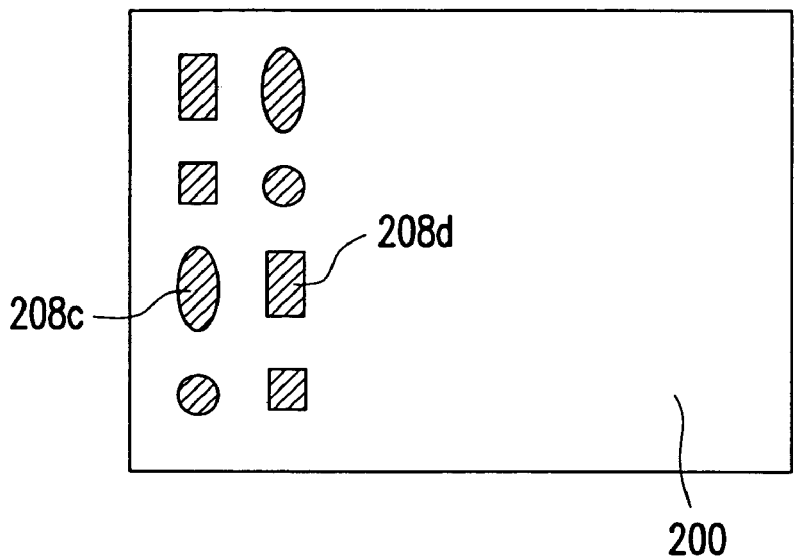

In considering all of foregoing possible options by either hole, indentation, or in mix, as for example, shown in FIGS. 9A-9C, the back plate 200 can have the mixed pattern from holes 208 and indentations 204. FIGS. 9A-9C are just the examples but not the only patterns. In other words, the foregoing design type can be applied by single or mix arrangement. In FIG. 9A, several. In FIGS. 9B and 9C, first and second holes 208a, 208b or first and second indentations 208c, 208d near to the electrode of the high voltage end (not shown) are the examples but not the only limitations. The shape of hole or indentation can be rectangular, square, circular or elliptic, in all the same or in mix. The shape and size can change according to the actual design.

Figure 1:
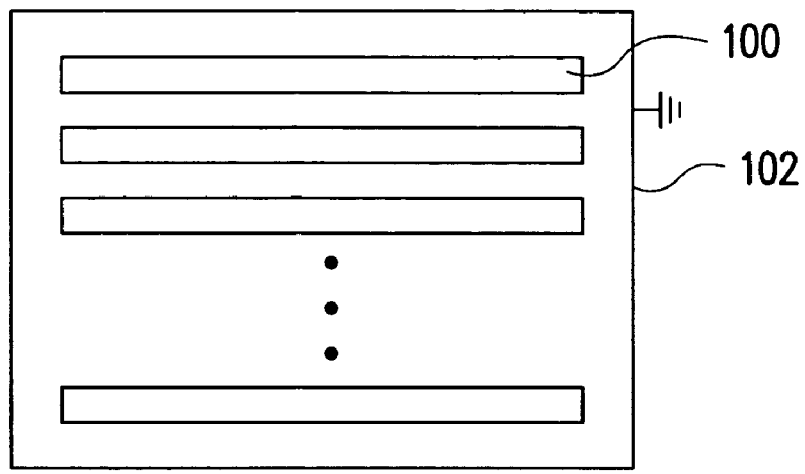
FIG. 1 is a top view, schematically illustrating a conventional backlight module.
Figure 2:
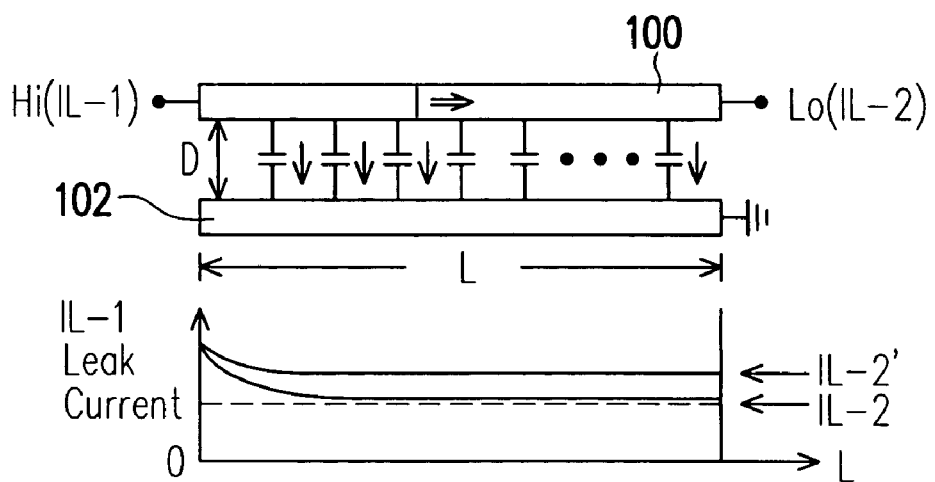
FIGS. 2-4 are drawings, schematically illustrating the phenomena of leak current occurring in the conventional backlight module.
Figure 3:
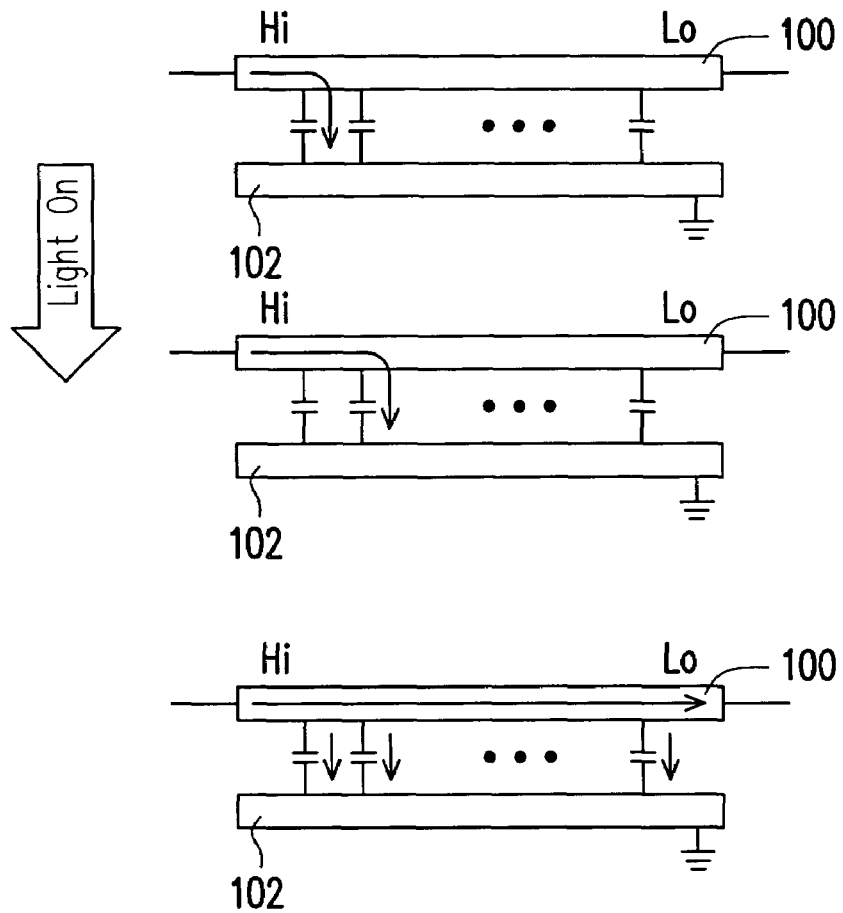
Figure 4:
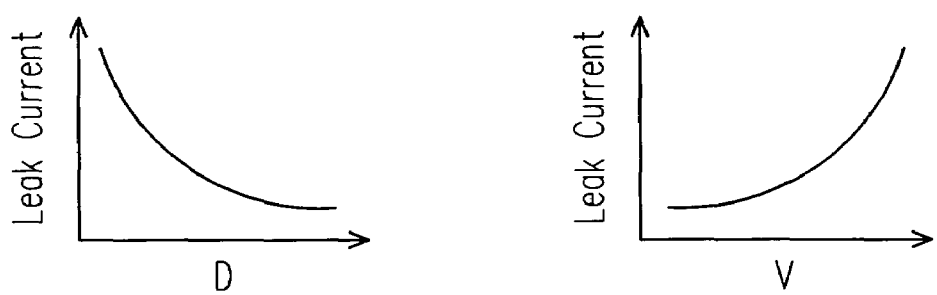

The present invention has effectively reduced the leak current of the lamp. Table 1 shows an experimental measurement. The condition A is for a single lamp without back plate under the lamp. Therefore, it has the intrinsic leak current 0.9 mA not caused by the conductive back plate. The condition B is adding the conventional back plate under the lamp. The condition C is adding the back plate of the present invention under the lamp. In conventional condition B, since the back plate is added, the leak current as described in FIGS. 1-3 occurs, and the additional leak current or the leak current caused by the back plate of 0.5 mA is produced at the low end, and the total leak current is 1.4 mA. However, for the present invention, the total leak current is 1.15 mA. After subtracting the intrinsic leak current of 0.9 mA, the leak current caused by the back plate of the present invention is 0.25 mA. In other words, the present invention can reduce leak current by at least about 30%~50%. Or preferably, the leak current from the back plate can be reduced by about 50%. However, these quantities are not the only limit condition of the present invention. According to the present invention, the leak current can be optimized to a proper quantity. It should be understood that the power and the lamp are the same for all of the above conditions. The absolute quantity of the measured current is depending on the operation voltage or power source. However, the relative quantities between the condition B and condition C show the improvement.

TABLE 1

| Condition | Hi end | Lo end | Leak current |
|---|---|---|---|
| A | 5.9 mA | 5.0 mA | 0.9 mA |
| B | 5.9 mA | 4.5 mA | 1.4 mA |
| C | 5.9 mA | 4.75 mA | 1.15 mA |

Figure 10:
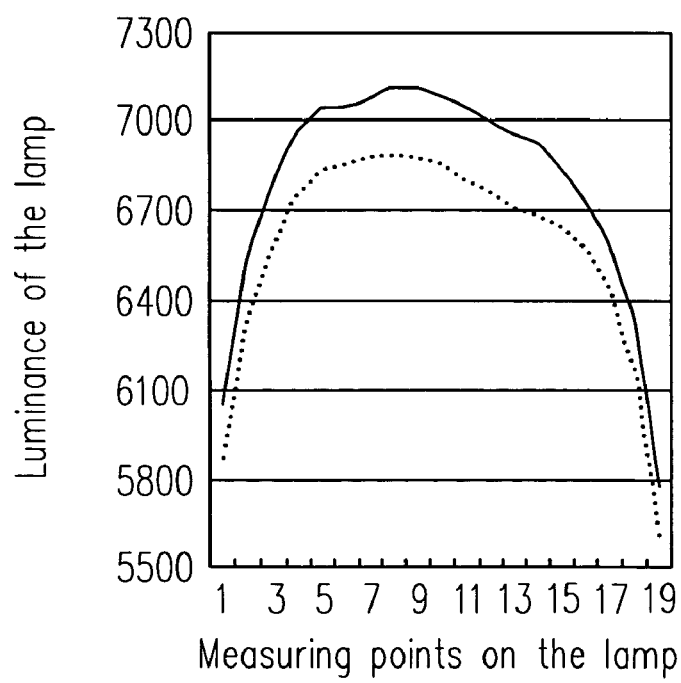
FIG. 10 is a drawing, schematically illustrating the improvement of luminance, according to the preferred embodiments of the present invention.

Also and, due to the leak current have been effectively reduced, the luminance of the lamp is improved. FIG. 10 is a drawing, schematically illustrating the improvement of luminance, according to the preferred embodiments of the present invention. In FIG. 10, by measuring the luminance along the lamp, the luminance curves of the conventional light module in dotted line and the light module of the present invention in solid line are schematically shown. The point 1 is close to the high voltage end and the point 19 is close to the low voltage end. The vertical axis is the luminance in relative scale. Since the leak current is reduced, the luminance (solid line) is improved. In estimation, the averaged luminance is improved by about 3%, while the uniformity of the luminance remain about the same.

The present invention has proposed the design of the back plate with the hole, the indentation, or the mix, so that the leak current due to the back plate is effectively reduced. The hole and the indentation can be single or mixed according to the actual design.

It will be apparent to those skilled in the art that various modifications and variations can be made to the structure of the present invention without departing from the scope or spirit of the present invention. In view of the foregoing descriptions, it is intended that the present invention cover modifications and variations of this invention if they fall within the scope of the following claims and their equivalents.

What is claimed is:

1. A backlight module used for a liquid crystal display, comprising:
    a back plate having a first indentation; and
    a lamp disposed on the back plate, having a longitudinal direction, a high voltage end having an electrode and a low voltage end opposing to the high voltage end;
    wherein the first indentation is overlapping to the electrode of the high voltage end of the lamp, the first indentation has a length and a width, the length of the first indentation is larger than twice of a diameter of the electrode of the high voltage end.

2. The backlight module according to claim 1, wherein the first indentation is a rectangular indentation, a square indentation, an ellipsoid indentation or a circular indentation.

3. The backlight module according to claim 1, wherein the back light plate has a second indentation, and the first indentation and the second indentation are distributed along the longitudinal direction of the lamp.

4. The backlight module according to claim 3, wherein the second indentation approaches to the electrode of the high voltage end.

5. The backlight module according to claim 1, wherein the back plate has a hole, and the first indentation and the hole are distributed along the longitudinal direction of the lamp.

6. The backlight module according to claim 5, wherein the hole approaches to the electrode of the high voltage end.

7. The backlight module according to claim 1, wherein the width of the first indentation is larger than a length of the electrode of the high voltage end.

8. The backlight module according to claim 1, further comprising a reflector covering the back plate and the first indentation.

* * * * *